United States Patent [19]

Klemen

[11] Patent Number: 4,683,776
[45] Date of Patent: Aug. 4, 1987

[54] TRANSMISSION GEARING ARRANGEMENT

[75] Inventor: Donald Klemen, Carmel, Ind.

[73] Assignee: General Motors Corporation, Detroit, Mich.

[21] Appl. No.: 833,260

[22] Filed: Feb. 27, 1986

[51] Int. Cl.⁴ .............................................. F16H 57/10
[52] U.S. Cl. .......................................... 74/765; 74/753
[58] Field of Search ................. 74/764, 765, 753, 759, 74/768, 770

[56] References Cited

U.S. PATENT DOCUMENTS

| | | | |
|---|---|---|---|
| 3,033,333 | 5/1962 | Breting et al. | 192/4 |
| 3,264,902 | 9/1966 | Breting et al. | 74/764 |
| 3,267,769 | 9/1966 | Tuck et al. | 74/759 |
| 3,282,131 | 11/1966 | Smith | 74/759 |
| 3,398,606 | 9/1968 | Utter | 74/759 |
| 3,503,282 | 3/1970 | Peterson | 74/759 |
| 3,913,415 | 10/1975 | Herr | 74/752 |
| 3,956,946 | 5/1976 | Murakami et al. | 74/770 |
| 3,996,817 | 12/1976 | Winzeler | 74/765 |
| 4,070,927 | 1/1978 | Polak | 74/765 |
| 4,478,106 | 10/1984 | Schreiner | 74/753 |

FOREIGN PATENT DOCUMENTS

| | | | |
|---|---|---|---|
| 2065393 | 9/1973 | Fed. Rep. of Germany | 74/759 |
| 929333 | 6/1963 | United Kingdom | 74/764 |
| 1105711 | 7/1984 | U.S.S.R. | 74/759 |

Primary Examiner—Leslie Braun
Assistant Examiner—David Novais
Attorney, Agent, or Firm—Saul Schwartz

[57] ABSTRACT

A planetary gearing arrangement for automotive transmissions wherein a fourth simple planetary gear set and a fourth brake are added to a gearing arrangement containing three simple planetary gear sets, three brakes and two clutches. In the fourth planetary gear set, the sun gear is connected to the input shaft, the carrier is connected to the fourth brake, and the ring gear is connected to the carrier and to the ring gear of two of the planetary gear sets described in the above-mentioned patent. The gearing arrangement of this invention achieves nine forward speed ranges and one reverse speed range with only single transition shifts and also has the capability for small, evenly spaced ratio steps including a first forward ratio low enough to permit use of the gearing arrangement without a torque converter.

1 Claim, 2 Drawing Figures

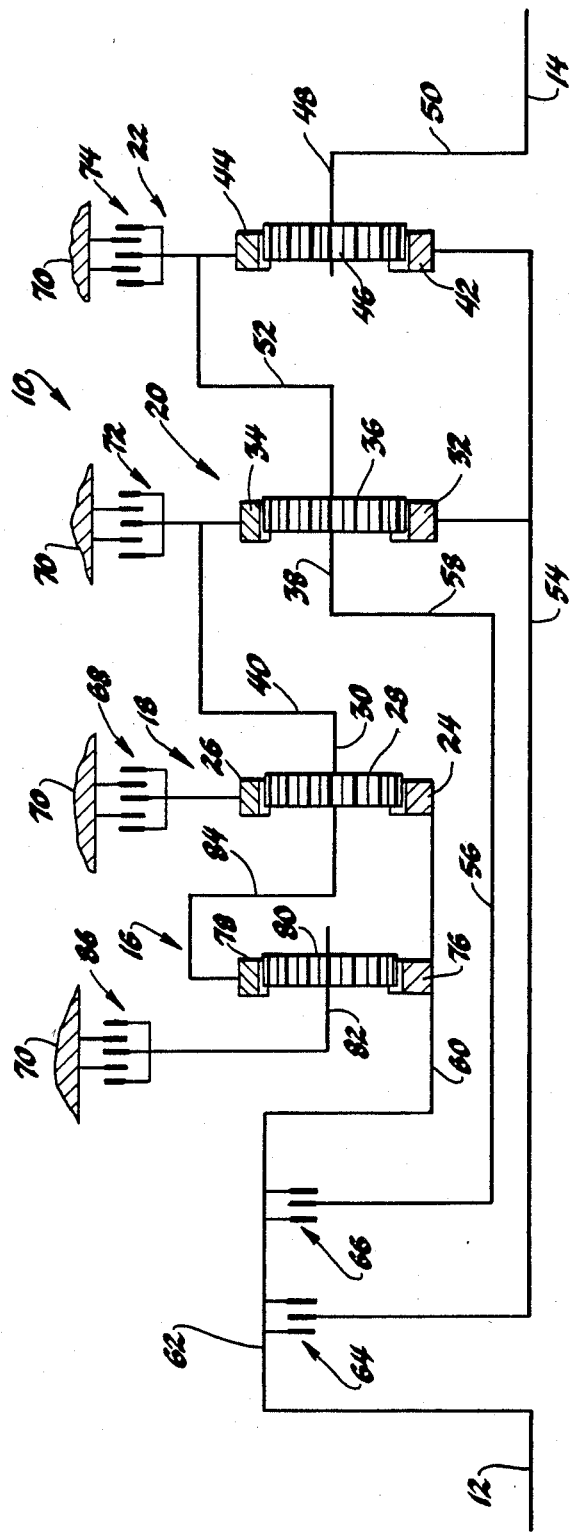

TRANSMISSION GEARING ARRANGEMENT

BACKGROUND OF THE INVENTION

1. Field of the Invention

This invention relates generally to gearing arrangements for automotive transmissions and, more particularly, to multiple simple planetary gear set arrangements.

2. Description of the Prior Art

In an automotive transmission planetary gearing arrangement described in U.S. Pat. No. 4,070,927, issued Jan. 31, 1978 to James C. Polak and assigned to the assignee of this invention ("Polak '927" hereinafter), three interconnected simple planetary gear sets, two rotating clutches, and three non-rotating clutches generally referred to as brakes cooperate to provide six forward speed ranges and one reverse range. When teamed with a torque converter, this arrangement offers attractive ratio coverage potential in a particularly simple and compact package. A planetary gearing arrangement according to this invention represents a novel improvement over the arrangement described in Polak '927 in that it retains the simplicity and compactness advantages of the latter yet offers the potential for broad ratio coverage in small steps including a first forward range low enough to permit usage of the new and improved arrangement without a torque converter.

SUMMARY OF THE INVENTION

The primary feature then of this invention is that it provides a new and improved automotive transmission gearing arrangement wherein compactness and simplicity advantages of the arrangement described in Polak '927 are retained and additional ratio coverage is achieved in a particularly simple and economical manner. Another feature of this invention is that it provides a new and improved transmission gearing arrangement wherein three forward speed ranges in addition to the six forward speed ranges of Polak '927 result from the addition of only a fourth simple planetary gear set and a fourth brake to the arrangement of Polak '927, the resulting nine forward speed ranges including a lowest first range established through the added fourth gear set. Still another feature of this invention resides in the provision in the new and improved gearing arrangement of a fourth simple planetary gear set including a sun gear continuously connected to the input shaft of the transmission, a ring gear rigidly connected to the planet carrier of the forwardmost one of the three planetary gear sets of the Polak '927 arrangement, and a plurality of planet gears rotatably supported on a carrier which is selectively braked by the added fourth brake, the output of the fourth planetary gear set being in a negative direction relative to the direction of rotation of the input shaft and being reversed and compounded by the active ones of the planetary gear sets of the Polak '927 arrangement to provide additional ratio steps in the forward direction.

BRIEF DESCRIPTION OF THE DRAWINGS

These and other features of this invention will be readily apparent from the following specification and from the drawings wherein:

FIG. 1 is a schematic representation of the new and improved transmission gearing arrangement according to this invention, and FIG. 2 is a table describing the clutch and brake operating sequence in the gearing arrangement according to this invention.

DESCRIPTION OF THE PREFERRED EMBODIMENT

Referring now to FIG. 1 of the drawings, a transmission gearing arrangement 10 according to this invention includes an input shaft 12, an output shaft 14 aligned with the input shaft, and four planetary gear sets 16, 18, 20 and 22. Gear sets 18, 20 and 22 correspond to the gear sets shown and described in Polak '927. Gear set 18 corresponds to the first gear set of the Polak '927 arrangement and includes a sun gear 24, a ring gear 26 and a plurality of planet gears 28 meshing with the sun gear and the ring gear and rotatably supported on a carrier 30. The gear set 20 corresponds to the second gear set of the Polak '927 arrangement and includes a sun gear 32, a ring gear 34 and a plurality of planet gears 36 meshing with the sun gear and the ring gear and rotatably supported on a carrier 38. A drum 40 rigidly connects the carrier 30 of the gear set 18 to the ring gear 34 of the gear set 20 for unitary rotation. The gear set 22 corresponds to the third gear set of the Polak '927 arrangement and includes a sun gear 42, a ring gear 44 and a plurality of planet gears 46 meshing with sun gear 32 and the ring and rotatably supported on a carrier 48. The carrier 48 is rigidly connected by a drum 50 to the output shaft 14 for rotation as a unit therewith. A drum 52 rigidly connects the carrier 38 of the gear set 20 and the ring gear 44 of the gear set 22 for unitary rotation.

A first intermediate shaft 54 aligned with the input and output shafts is rigidly connected to each of the sun gears 32 and 42 in the gear sets 20 and 22 whereby the sun gears are rotatable as a unit. A tubular second intermediate shaft 56, around the first intermediate shaft 54, is rigidly connected by a drum 58 to the carrier 38 of the gear set 20 so that the carrier 38 and the ring gear 44 of the gear set 22 rotate as a unit with the second intermediate shaft. A tubular third intermediate shaft 60 around the first and second intermediate shafts 54 and 56 is rigidly connected to the sun gear 24 of the gear set 18. A rotating clutch housing 62 is rigidly connected to the input shaft 12 and to the third intermediate shaft 60 so that the third intermediate shaft and the sun gear 24 rotate continuously as a unit with the input shaft 12.

A first rotating clutch 64 is disposed between the first intermediate shaft 54 and the rotating housing 62 and is selectively operable to connect the first intermediate shaft to the input shaft 12 for rotation as a unit therewith. A second rotating clutch 66 is disposed between the second intermediate shaft 56 and the rotating housing 62 and is selectively operable to connect the second intermediate shaft to the input shaft 12 for rotation as a unit therewith. When the rotating clutches 64 and 66 are disengaged, the input shaft 12 is rotatable relative to each of the first and second intermediate shafts 54 and 56.

A brake 68 is disposed between the ring gear 26 of the gear set 18 and a stationary housing 70 in which the gearing arrangement 10 is disposed and is selectively operable to rigidly connect the ring gear 26 to the housing 70 whereby rotation of the ring gear is prevented. A brake 72 is disposed between the ring gear 34 of the gear set 20 and the stationary housing 70 and is selectively operable to rigidly connect the ring gear to the stationary housing whereby rotation of both the ring gear and the carrier 30 of the gear set 18 is prevented. A brake 74 is disposed between the ring gear 44 of the gear set 22 and the stationary housing 70 and is selectively operable to rigidly connect the ring to the housing whereby rotation of the ring gear and of the carrier 38 of the gear set 20 and the second intermediate shaft 56 is prevented.

The elements described thus far, except gear set 16, are identical to the elements of the Polak '927 arrangement. The gear set 16 includes a sun gear 76, a ring gear 78 and a plurality of planet gears 80 meshing with the sun gear and the ring gear and rotatably supported on a carrier 82. The sun gear 76 is rigidly connected to the third intermediate shaft 60 for rotation as a unit therewith and as a unit with the sun gear 24 of the gear set 18. A drum 84 rigidly connects the ring gear 78 with the carrier 30 of the gear set 18 whereby the ring gear 78 rotates as a unit with the carrier 30 and with the ring gear 34 of the gear set 20. A brake 86 is disposed between the stationary housing 70 and the carrier 82 and is selectively operable to rigidly connect the carrier to the housing.

Referring now to FIGS. 1 and 2 of the drawings and describing the operation of the gearing arrangement 10, an important feature of the gearing arrangement is that it retains the advantage of the Polak '927 arrangement of single transition shifting throughout the nine forward and one reverse ranges. In neutral, the input shaft 12 rotates with the engine and continuously drives, in conventional fashion, a pump for supplying hydraulic pressure to the control system for the gearing arrangement 10. In neutral, the control system applies brake 74 of the gear set 22 to ground the ring gear 44, the carrier 38 of the gear set 20 and the second intermediate shaft 56. All other clutches and brakes are disengaged and released.

The control has a conventional automatic shifting mode for the gearing arrangement whereby the clutches and brakes are sequentially engaged and disengaged and applied and released in response to vehicle speed and power demand. From neutral, a first forward range is achieved in a single transition shift through application of brake 86. The control gradually applies the brake 86 to initiate torque transfer through the gear set 16. As the brake 86 arrests rotation of the carrier 82, the planet gears 80 begin to rotate the ring gear 78 at a reduced speed determined by the ratio of the gears in the gear set in the opposite or negative direction relative to the rotation of the input shaft 12.

The negatively directed torque output of the gear set 16 is directed into the gear set 20 because the ring gear 34 is rigidly connected to the ring gear 78. In the gear set 20, the carrier 38 is held stationary by the brake 74 so that the planet gears 36 rotate the sun gears 32 and 42 in the positive or same direction of rotation as the input shaft 12. In the gear set 22, then, with brake 74 applied, the carrier 48 and output shaft 14 rotate in the positive direction. Because of the compounding of the gear reductions effected in the gear sets 16 and 22, the overall gear ratio between the input shaft 12 and the output shaft 14 can be made sufficiently low without the assistance of a torque converter to overcome the inertia of the stationary vehicle and commence movement thereof in the forward direction corresponding to rotation of the output shaft in the positive direction.

At a predetermined speed of the output shaft 14, a second forward speed is achieved in another single transition shift through simultaneous release of the brake 86 and engagement of rotating clutch 64. The second forward speed thus achieved through the first intermediate shaft 54 and the gear set 22 corresponds to the first drive range of the Polak '927 arrangement. At a still higher predetermined speed of the output shaft 14, a third forward speed is achieved in another single transition shift through simultaneous release of brake 74 and application of brake 86. When the brake 86 achieves full application, the carrier 82 is stationary so that the sun gear 76, rotating with the input shaft, drives the ring gear 78 in the negative direction at reduced speed. In gear set 20, the ring gear 34 is driven in the negative direction by the ring gear 78 through drums 84 and 40 and carrier 30. Simultaneously, sun gear 32 in the gear set 20 is driven at input shaft speed in the positive direction by first intermediate shaft 54. The net result is that carrier 38 rotates in the positive direction and, through drum 52, drives ring gear 44 in the gear set 22 in the positive direction. In the gear set 22, then, with sun gear 42 rotating in the positive direction at input shaft speed and the ring gear 44 rotating in the positive direction at a slower speed, the carrier 48 and output shaft 14 are driven in the positive direction.

At successively higher speeds of the output shaft 14, fourth, fifth, sixth, seventh and eighth forward speed ranges are achieved through additional single transition shifts. As seen in FIG. 2, third through sixth speed range are achieved by simultaneous release and application, respectively, of brake 86 and brake 72 for the three-to-four shift of brake 72 and brake 68 for the four-to-five shift, and release of brake 68 and engagement of rotating clutch 66 for the five-to-six shift, all occurring while rotating clutch 64 is engaged. To effect six-to-seven and seven-to-eight shifts, the rotating clutch 66 is maintained engaged while clutch 64 and brake 68 are simultaneously disengaged and applied (six-to-seven), respectively, and brakes 68 and 72 are simultaneously released and applied (seven-to-eight), respectively. The torque paths defined through the gear arrangement 10 in the fourth through eighth forward ranges correspond to the torque paths through the Polak '927 arrangement in second through sixth forward ranges.

The ninth forward range is achieved through a single transition shift when the brake 72 is released and the brake 86 is simultaneously applied while the rotating clutch 66 is engaged. In the ninth forward speed range, the negative output of the gear set 16 is applied to the ring gear 34 of the gear set 20 while the carrier 38 is rotated in the positive direction through the rotating clutch 66. Accordingly, the sun gear 32 of the gear set 20 is overdriven in the positive direction as is the sun gear 42 in the gear set 22. In the latter gear set, the ring gear 44 defines a reaction member for the sun gear 42 so that the carrier 48 and the output shaft 14 are driven in the forward direction.

The reverse speed range on the opposite side of neutral from the first forward speed range is achieved in a single transition shift by application of brake 68 while the brake 74 is applied.

The embodiments of the invention in which an exclusive property or privilege is claimed are defined as follows:

1. A gearing arrangement for an automotive power transmission comprising:
    an input shaft and an output shaft;
    first, second, and third simple planetary gear sets each having a sun gear, a ring gear, and a plurality of planet gears meshing with said sun and said ring gears and rotatably supported on a planet carrier;

means rigidly interconnecting the ring gear of said third gear set and the carrier of said seocnd gear set;

means rigidly interconnecting the ring gear of said second gear set and the carrier of said first gear set;

means rigidly connecting said output shaft and the carrier of said third gear set;

a first intermediate shaft rigidly interconnecting the sun gears of said second and said third gear sets for unitary rotation;

a second intermediate shaft rigidly connected to the carrier of said second gear set;

a third intermediate shaft continuously connected to said input shaft and to the sun gear of said first gear set;

first, second, and third brake means operative to selectively brake rotation of the ring gears of said first, said second, and said third gear sets, respectively;

a first rotating clutch selectively operable to connect said input shaft and said first intermediate shaft for unitary rotation;

a second rotating clutch selectively operable to connect said input shaft and said second intermediate shaft for unitary rotation;

a fourth simple planetary gear set including a sun gear and a ring gear and a plurality of planet gears meshing with said sun and said ring gears and rotatably supported on a planet carrier;

means rigidly connecting the sun gear of said fourth gear set to said third intermediate shaft;

means rigidly connecting the ring gear of said fourth gear set to the carrier of said first gear set; and a fourth brake means selectively operable to brake the carrier of said fourth gear set, whereby nine forward ratios are obtainable while preserving a single transition shifting over the entire nine forward ratios.

* * * * *